United States Patent
Choi et al.

(10) Patent No.: US 10,651,500 B2
(45) Date of Patent: May 12, 2020

(54) POSITIVE ELECTRODE ACTIVE MATERIAL FOR LITHIUM SECONDARY BATTERY, METHOD FOR PREPARING THE SAME, AND SECONDARY BATTERY INCLUDING THE SAME

(71) Applicant: LG Chem, Ltd., Seoul (KR)

(72) Inventors: Ji Hoon Choi, Daejeon (KR); In Kook Jun, Daejeon (KR); Seung Beom Cho, Daejeon (KR)

(73) Assignee: LG Chem, Ltd. (KR)

( * ) Notice: Subject to any disclaimer, the term of this patent is extended or adjusted under 35 U.S.C. 154(b) by 92 days.

(21) Appl. No.: 15/567,228

(22) PCT Filed: Apr. 27, 2016

(86) PCT No.: PCT/KR2016/004409
§ 371 (c)(1),
(2) Date: Oct. 17, 2017

(87) PCT Pub. No.: WO2016/175554
PCT Pub. Date: Nov. 3, 2016

(65) Prior Publication Data
US 2018/0090782 A1 Mar. 29, 2018

(30) Foreign Application Priority Data

Apr. 30, 2015 (KR) .................. 10-2015-0061634
Apr. 25, 2016 (KR) .................. 10-2016-0050071

(51) Int. Cl.
| H01M 10/052 | (2010.01) |
| H01M 4/36 | (2006.01) |
| H01M 4/131 | (2010.01) |
| H01M 4/505 | (2010.01) |
| H01M 4/62 | (2006.01) |
| H01M 4/1391 | (2010.01) |
| H01M 4/525 | (2010.01) |
| H01M 4/58 | (2010.01) |
| G01N 23/20 | (2018.01) |
| H01M 4/02 | (2006.01) |

(52) U.S. Cl.
CPC ......... H01M 10/052 (2013.01); H01M 4/131 (2013.01); H01M 4/1391 (2013.01); H01M 4/366 (2013.01); H01M 4/505 (2013.01); H01M 4/525 (2013.01); H01M 4/58 (2013.01); H01M 4/62 (2013.01); G01N 23/20075 (2013.01); H01M 2004/027 (2013.01); H01M 2004/028 (2013.01)

(58) Field of Classification Search
None
See application file for complete search history.

(56) References Cited

U.S. PATENT DOCUMENTS

| 8,906,553 B1 | 12/2014 | Hagh et al. |
| 2009/0081554 A1 | 3/2009 | Takada et al. |
| 2011/0081578 A1 | 4/2011 | Chang et al. |
| 2011/0151328 A1 | 6/2011 | Chang et al. |
| 2012/0104334 A1 | 5/2012 | Lee et al. |
| 2012/0295168 A1 | 11/2012 | Holzapfel et al. |
| 2014/0193689 A1 | 7/2014 | Takami et al. |
| 2014/0308576 A1 | 10/2014 | Gaben et al. |
| 2015/0311507 A1 | 10/2015 | Miki et al. |
| 2016/0093914 A1 | 3/2016 | Tanoue et al. |

FOREIGN PATENT DOCUMENTS

| CN | 102272984 A | 12/2011 |
| CN | 102272985 A | 12/2011 |
| JP | 2009064732 A | 3/2009 |
| JP | 2012099482 A | 5/2012 |
| JP | 2013507317 A | 3/2013 |
| JP | 2014239030 A | 12/2014 |
| JP | 2014534592 A | 12/2014 |
| JP | 2015072772 A | 4/2015 |
| KR | 20140098433 A | 8/2014 |
| KR | 101463996 B1 | 11/2014 |
| KR | 20150018562 A | 2/2015 |
| KR | 20150024564 A | 3/2015 |
| WO | 2007004590 A1 | 1/2007 |
| WO | 2013140565 A1 | 9/2013 |
| WO | 2013146349 A1 | 10/2013 |
| WO | 2014132333 A1 | 9/2014 |

OTHER PUBLICATIONS

Cho, J. et al., Comparison of Overcharge Behavior of AlPO4-Coated LiCoO2 and LiNi0.8 Co0.1 Mn0.1O2 Cathode Materials in Li-Ion Cells, Journal of the Electrochemical Society, Sep. 2004, vol. 151, No. 10, pp. A1707-A1711.
Inernational Search Report from PCT/KR2016/004409, dated Jul. 29, 2016.
Morimoto et al, Preparation of lithium ion conducting solid electrolyte of Nasicon-type Li1þxAlxTi2_x(PO4)3 (x ¼ 0.3) obtained by using the mechanochemical method and its application as surface modification materials of LiCoO2 cathode for lithium cell, Journal of Power Sources, May 2013, vol. 240, 636-643.

(Continued)

Primary Examiner — Sarah A. Slifka
(74) Attorney, Agent, or Firm — Lerner, David, Littenberg, Krumholz & Mentlik, LLP

(57) ABSTRACT

The present invention relates to a positive electrode active material for a secondary battery, a method for preparing the same, and a secondary battery including the same, and more particularly to a positive electrode active material for a secondary battery, which includes lithium transition metal oxide particles represented by Formula 1; and lithium metal phosphate nanoparticles disposed on the surface of the lithium transition metal oxide particles and represented by Formula 2, a method for preparing the same, and a lithium secondary battery including the same $$Li_{(1+a)}(Ni_{1-b-c}M_bCo_c)O_2 \quad \text{[Formula 1]}$$

In which, M is at least one metal selected from the group consisting of Mn, Al, Cu, Fe, Mg, Cr, Sr, V, Sc and Y, $0 \le a \le 0.2$, $0 \le b \le 1$, and $0 \le c \le 1$ $$Li_{1+x}M'_xM''_{2-x}(PO_4)_3 \quad \text{[Formula 2]}$$

In which, M' is Al, Y, Cr, or Ca, M" is Ge, Ti, Sn, Hf, Zn, or Zr, and $0 \le x \le 0.5$.

18 Claims, 18 Drawing Sheets

(56) References Cited

OTHER PUBLICATIONS

Wu, X, et al., Synthesis and characterization of Li1.3Al0.3Ti1.7(PO4)3-coated LiMn2O4 by wet chemical route, Rare Metals, Apr. 2009, vol. 28, No. 2, pp. 122-126.
Wu, Xian Ming et al, Synthesis of Li1.3Al0.3Ti1.7(PO4)3 by sol-gel technique, Materials Letter, Mar. 2004, vol. 58, Issue 7, pp. 1227-1230.
Chinese Search Report for Application No. 201680024959.6, dated Mar. 3, 2020, pp. 1-4.

POSITIVE ELECTRODE ACTIVE MATERIAL FOR LITHIUM SECONDARY BATTERY, METHOD FOR PREPARING THE SAME, AND SECONDARY BATTERY INCLUDING THE SAME

CROSS-REFERENCE TO RELATED APPLICATIONS

The present application is a national phase entry under 35 U.S.C. § 371 of International Application No. PCT/KR2016/004409 filed Apr. 27, 2016, which claims priority from Korean Patent Application No. 10-2015-0061634, filed Apr. 30, 2015 and Korean Patent Application No. 10-2016-0050071, filed Apr. 25, 2016, all of which are hereby incorporated herein by referenced.

TECHNICAL FIELD

The present invention relates to a positive electrode active material for a lithium secondary battery, a method for preparing the same, and a lithium secondary battery including the same, and more particularly, to a positive electrode active material for a lithium secondary battery having lithium ion conductivity, a method for preparing the same, and a lithium secondary battery including the same.

BACKGROUND ART

Recently, lithium secondary batteries are mainly used as a power source of mobile IT devices such as cellular phones and the need for lithium secondary batteries having high performance and high capacity is increasing in line with the increase of demand for electric vehicles (plug-in vehicles) and energy storage systems (ESS).

Lithium secondary batteries have a principle of producing electricity via the transfer of lithium ions (Li$^+$) which are present in an ionic state from a positive electrode to a negative electrode during discharge and the transfer thereof from a negative electrode to a positive electrode during charge, and at this time, via the transfer of electrons with the lithium ions.

As the positive electrode active materials of lithium secondary batteries, various metal oxides such as a layered oxide (LiCoO$_2$, LiNi$_{1-x-y}$Co$_x$Mn$_y$O$_2$ (0<x<1, 0<y<1)), a spinel oxide (LiMn$_2$O$_4$) and an olivine oxide (LiFePO$_4$) are used.

Recently, in order to further improve the electrochemical properties of such positive electrode active materials for a lithium secondary battery, research on the change of the composition of the positive electrode active materials, the control of a particle size, or the surface modification technique of a positive electrode active material is being diversely conducted.

The surface modification technique of the positive electrode active material can effectively improve defects concerning the deterioration of battery properties due to side-reactions by the direct contact of the positive electrode active material with an electrolyte and thermal stability, and is reported as an important technique for developing a high capacity/high energy material.

However, a surface modification material used for the modification of the surface of the positive electrode active material mainly includes metal oxides which are chemically stable but have low electric or ionic conductivity, and the movement of lithium ions is limited, thereby possibly generating defects of decreasing a capacity.

Accordingly, development on the research of a surface modification material and a surface modification method, by which high lithium ion conductivity may be attained, and a positive electrode active material may be imparted with structural stability, is urgent.

PRIOR ART DOCUMENT

Korean Registration Patent Publication No. 10-1463996
Korean Laid-open Patent Publication No. 10-2015-0024564

DISCLOSURE OF THE INVENTION

Technical Problem

A first aspect of the present invention is to provide a positive electrode active material for a secondary battery, which may offer high lithium ion conductivity and include lithium metal phosphate nanoparticles which are capable of increasing the structural stability of the positive electrode active material.

In addition, a second aspect of the present invention is to provide a method for preparing the positive electrode active material.

In addition, a third aspect of the present invention is to provide a positive electrode for a secondary battery which has high capacity, thermal stability and improved life at a high temperature by including the positive electrode active material of which surface is modified.

In addition, a fourth aspect of the present invention is to provide a lithium secondary battery which is provided with the positive electrode for a lithium secondary battery.

Technical Solution

To solve the tasks, according to an aspect of the present invention, there is provided a positive electrode active material for a secondary battery comprising:
lithium transition metal oxide particles represented by the following Formula 1; and
lithium metal phosphate nanoparticles disposed on a surface of the lithium transition metal oxide particles, wherein the lithium metal phosphate nanoparticles are represented by the following Formula 2:

$$Li_{(1+a)}(Ni_{1-b-c}M_bCo_c)O_2 \quad \text{[Formula 1]}$$

in which, M is at least one metal selected from the group consisting of Mn, Al, Cu, Fe, Mg, Cr, Sr, V, Sc and Y, 0≤a≤0.2, 0≤b≤1, and 0≤c≤1,

$$Li_{1+x}M'_xM''_{2-x}(PO_4)_3 \quad \text{[Formula 2]}$$

in which, M' is Al, Y, Cr, or Ca, M'' is Ge, Ti, Sn, Hf, Zn, or Zr, and 0≤x≤0.5.

According to another aspect of the present invention, there is provided a method for preparing a positive electrode active material for a secondary battery comprising:
(a) synthesizing lithium metal phosphate nanoparticles represented by the Formula 2;
(b) dispersing the lithium metal phosphate nanoparticles in a dispersion solvent to prepare a coating solution; and
(c) mixing the coating solution with lithium transition metal oxide particles to coat a surface of the lithium transition metal oxide particles with the lithium metal phosphate nanoparticles.

In addition, the method may further comprise a step of heat treating after coating according to the crystalline state of the lithium metal phosphate nanoparticles disposed on the surface of the lithium transition metal oxide particles.

Also, the present invention provides a secondary battery comprising a positive electrode containing a surface modified positive electrode active material, a negative electrode containing a negative electrode active material, a separator disposed between the positive electrode and the negative electrode, and a non-aqueous electrolyte.

Advantageous Effects

As described above, a positive electrode active material which has increased structural stability and lithium ion conductivity may be prepared by coating the surface of a lithium transition metal oxide with lithium metal phosphate nanoparticles having lithium conductivity in the present invention. In addition, side reactions of an electrolyte and a positive electrode active material may be prevented by a surface modified positive electrode active material, and a lithium secondary battery having improved rate determination properties, stability at a high temperature and a high pressure, and cycle life properties may be manufactured.

MODE FOR CARRYING OUT THE INVENTION

Figure 1:
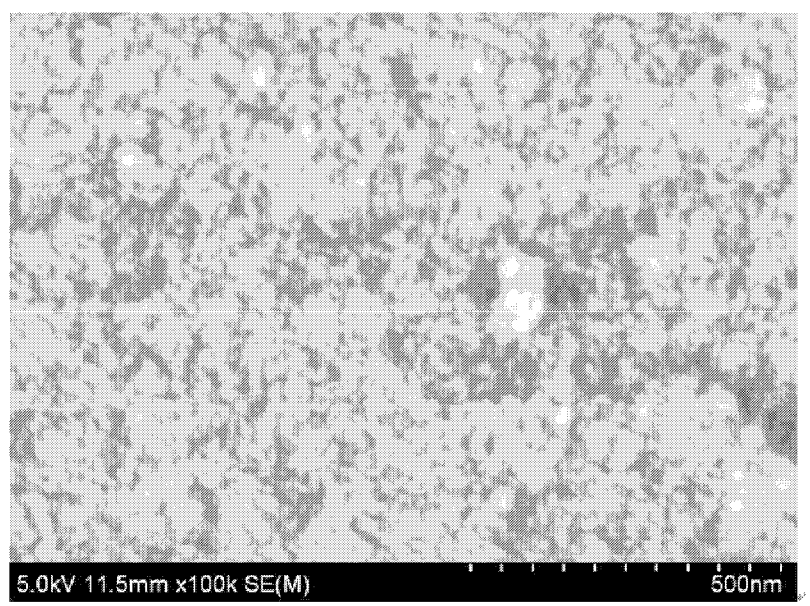
FIG. 1 illustrates a scanning electron microscope (SEM) image of lithium metal phosphate nanoparticles prepared in Preparation Example 1.

Hereinafter, the present invention will be described in more detail.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Meanwhile, in the present disclosure, the terms "ionic conductivity" are understood to have the same meaning as the terms "ion conductive", "ion conductivity", or the like.

The conventional positive electrode active material is known to improve efficiency on a high rate via surface modification, because of the free flow of electrons, and the function as a mechanical and chemical protection shell, thereby improving the structural stability of a secondary battery. Materials used for the surface modification include chemically stable carbonaceous material, or metal oxides having low electric and ionic conductivity such as $Al_2O_3$ and $ZrO_2$. However, when the metal oxide having a low electric and ionic conductivity is coated, defects of limiting movement of lithium ions between an electrolyte and a positive electrode active material and increasing interface resistance may be generated.

Accordingly, there is provided in the present invention a surface modification material which provides high lithium ion conductivity and improved structural stability of a positive electrode active material.

Positive Electrode Active Material

Particularly, in an embodiment of the present invention, there is provided a positive electrode active material for a secondary battery comprising:

lithium transition metal oxide particles represented by the following Formula 1; and lithium metal phosphate nanoparticles disposed on a surface of the lithium transition metal oxide particles and represented by the following Formula 2:

$$Li_{(1+a)}(Ni_{1-b-c}M_bCo_c)O_2 \quad \text{[Formula 1]}$$

in which, M is at least one metal selected from the group consisting of Mn, Al, Cu, Fe, Mg, Cr, Sr, V, Sc and Y, $0 \le a \le 0.2$, $0 \le b \le 1$, and $0 \le c \le 1$,

$$Li_{1+x}M'_xM''_{2-x}(PO_4)_3 \quad \text{[Formula 2]}$$

in which, M' is Al, Y, Cr, or Ca, M'' is Ge, Ti, Sn, Hf, Zn, or Zr, and $0 \le x \le 0.5$.

First, in the positive electrode active material of the present invention, the lithium transition metal oxide represented by Formula 1 may include a lithium transition metal oxide having an average operation voltage of 4.3 V to 5.0 V, and typical examples thereof may include at least one selected from the group consisting of $LiCoO_2$, $LiNi_{0.85}Co_{0.10}Al_{0.05}O_2$ (NCA), and $LiNi_{1-x-y}Co_xMn_yO_2$ (NMC) ($0 \le x \le 1$, $0 \le y \le 1$). Particularly, the lithium transition metal oxide represented by Formula 1 may include a material of a ternary system of $LiNi_{1-x-y}Co_xMn_yO_2$ (NMC) ($0 \le x \le 1$, $0 \le y \le 1$), for example, $LiNi_{0.6}Mn_{0.2}Co_{0.2}O_2$, or the like.

In addition, the lithium transition metal oxide may further include at least one of a compound with a spinel structure or a compound with an olivine structure in addition to the lithium transition metal oxide particles represented by Formula 1. Particularly, the compound with an olivine structure may use $LiMn_xO_{2x}$ (x=1, 2), $LiNi_{1-x}Mn_xO_2$ ($0<x<1$), $LiNi_{1-x-y}Co_xMn_yO_2$ ($0 \le x \le 0.5$, $0 \le y \le 0.5$), $LiFeO_2$, $V_2O_5$, $TiS$, $MoS$, or the like.

In addition, in the positive electrode active material of the present invention, the lithium metal phosphate nanoparticles represented by Formula 2 refer to a lithium ion conductor material which provides high lithium ion conductivity and has a NASICON structure.

The "NASICON" is an abbreviation of a Na super ion conductor and includes, for example, $Na_3Zr_2Si_2PO_{12}$, or $NaZr_2(PO_4)_3$, or the like.

The lithium metal phosphate nanoparticles of the present invention has the same or similar crystal structure as that of the NASICON compound, where Na is substituted with lithium, and Zr is partially or entirely substituted with other metals.

In particular, the lithium metal phosphate nanoparticles represented by Formula 2 may include $LiTi_2(PO_4)_3$, $LiZr_2(PO_4)_3$, or at least one material selected from the group consisting of $Li_{1+x}Al_xTi_{2-x}(PO_4)_3$ ($0 \le x \le 0.5$), referred to as "LATP"), $Li_{1-x}Al_xZr_{2-x}(PO_4)_3$ ($0 \le x \le 0.5$), and $Li_{1+x}Y_xZr_{2-x}(PO_4)_3$ ($0 \le x \le 0.5$, referred to as "LYZP"), in which Li is partially substituted with Al or Y. Particularly, the lithium metal phosphate nanoparticles represented by Formula 2 may typically include $Li_{1.4}Al_{0.4}Ti_{1.6}(PO_4)_3$, $Li_{1.15}Al_{0.15}Zr_{1.85}(PO_4)_3$, or $Li_{1.15}Y_{0.15}Zr_{1.85}(PO_4)_3$.

In this case, $LiTi_2(PO_4)_3$ and $LiZr_2(PO_4)_3$ showed lithium ion conductivity of $1 \times 10^{-6}$ S/cm at room temperature. In contrast, $Li_{1+x}Al_xTi_{2-x}(PO_4)_3$, $Li_{1+x}Al_xZr_{2-x}(PO_4)_3$ ($0 \le x \le 5$), and $Li_{1+x}Y_xZr_{2-x}(PO_4)_3$, in which Li is partially substituted with Al or Y, showed even higher lithium ion conductivity of $1 \times 10^{-3}$ S/cm to $1 \times 10^{-5}$ S/cm at room temperature.

The lithium metal phosphate nanoparticles may be prepared in a shape having an average particle diameter (D50) based on a major axis of 200 nm or less, particularly, 10 nm to 200 nm, more particularly, 10 nm to 100 nm.

In addition, in the positive electrode active material of the present invention, the lithium metal phosphate nanoparticles may be included in an amount of 0.1 wt % to 2 wt %, particularly, 0.3 wt % to 1 wt % based on the total weight of the positive electrode active material. If the amount of the lithium metal phosphate nanoparticles is less than 0.1 wt %, effect obtainable by coating may be insignificant, and if the amount is greater than 2 wt %, the amount of the positive electrode active material is relatively decreased, and capacity per unit gram may decrease.

The lithium ion conductivity of the positive electrode active material including the lithium metal phosphate nanoparticles of the present invention may be from $1 \times 10^{-3}$ S/cm to $1 \times 10^{-6}$ S/cm, particularly, from $1 \times 10^{-4}$ S/cm to $1 \times 10^{-5}$ S/cm.

In the positive electrode active material of the present invention, the lithium metal phosphate nanoparticles disposed on the surface of the transition metal oxide particles have a very stable structure due to a strong P—O bond. That is, the thermal stability at the surface of the transition metal oxide particles may be improved, and very stable lithium metal phosphate nanoparticles may be disposed in a reaction with an electrolyte due to strong covalency of the surface of the transition metal oxide particles with $PO_4^-$ anions (polyanions).

In addition, the lithium metal phosphate nanoparticles may play the role of a protective layer at the surface of the lithium transition metal oxide particles, while allowing surface modification. Particularly, in the present invention, a lithium metal phosphate compound which is nanoparticulated to a size of 200 nm or less is disposed or coated on the surface of the lithium transition metal oxide particles, and a thin film having a "Co—Al—O—F" type is formed on the surface of the transition metal oxide particles via the reaction with an electrolyte including a $LiPF_6$ source during charge and discharge, thereby increasing structural stability. Thus, side reactions with the electrolyte may be prevented, and the dissolution of a transition metal such as cobalt (Co dissolution) may be restrained. As a result, the lithium ion conductivity of a positive electrode active material is increased and rate determination properties are improved, thereby providing a secondary battery having excellent cycle life properties.

Method for Preparing Positive Electrode Active Material

In addition, there is provided in an embodiment of the present invention, a method for preparing a positive electrode active material for a secondary battery comprising:

(a) synthesizing lithium metal phosphate nanoparticles represented by Formula 2;

(b) dispersing the lithium metal phosphate nanoparticles in a dispersion solvent to prepare a coating solution; and (c) mixing the coating solution with lithium transition metal oxide particles to coat surface of the lithium transition metal oxide particles with the lithium metal phosphate nanoparticles.

As described above, in the present invention, lithium metal phosphate nanoparticles having a uniform size with an average particle diameter of 200 nm or less are first synthesized, and then the surface of transition metal oxide particles is coated therewith to dispose the lithium metal phosphate nanoparticles on the surface of the transition metal oxide particles.

In this case, the method may additionally include or omit a step of heat treating after the coating step depending on the crystal state of the lithium metal phosphate nanoparticles. For example, when the synthesized lithium metal phosphate nanoparticles have a crystallized NASICON state, a subsequent heat treating step is not necessarily conducted, but when the synthesized lithium metal phosphate nanoparticles have an amorphous state, a subsequent heat treating step is additionally conducted for crystallization.

Meanwhile, in the preparation method of a positive electrode active material of the present invention, step (a) for synthesizing lithium metal phosphate nanoparticles may comprise:

preparing a mixture solution by injecting a reaction solvent, a lithium precursor, a phosphor precursor, and at least two kinds of metal precursors into a reactor at an atmospheric pressure;

stirring the mixture solution while elevating the temperature to 200° C.; and cooling the mixture solution after finishing a reaction to obtain the lithium metal phosphate nanoparticles.

In this case, the size of the crystallized lithium metal phosphate nanoparticles may be such that an average particle diameter (D50) referenced to a main axis is 200 nm or less, particularly, 10 nm to 200 nm, more particularly, 10 nm to 100 nm.

In this case, the reactor at an atmospheric pressure used in the method of the present invention may use a reactor commonly used for preparing a positive electrode active material in the art, and the type is not specifically limited. For example, an open type reactor or an enclosed type reactor may be used.

In addition, in the method of the present invention, the reaction solvent is a non-aqueous solution and may use a solvent including diol, polyol, or glycol, which has at least two hydroxyl groups in a molecule. Particularly, any one selected from the group consisting of ethylene glycol, 1,2-propylene glycol, 1,3-propylene glycol, glycerin, glycerol, diethyl glycol, 1,2-butanediol, 1,3-butanediol, 1,4-butanediol, and 2,3-butanediol, or a mixture of at least two thereof may be used.

In the conventional solid phase method, a simple pulverization method is used, and lithium metal phosphate particles having a size of several tens nm is difficult. In contrast, in the present invention, a polyol synthesis reaction using a solvent including diol, polyol or glycol having at least two hydroxyl groups is conducted, and lithium metal phosphate nanoparticles having a size of a few to several tens nm may be prepared. Also, particles may be crystallized or the particle size may be controlled by elevating the temperature during the polyol reaction, or increasing the reaction time.

In this case, the reaction solvent may be used in an amount of 100 parts by weight to 10,000 parts by weight, particularly, 100 parts by weight to 1,000 parts by weight based on 100 parts by weight of the total amount of the precursors.

In addition, in the method of the present invention, the lithium precursor may particularly be any one selected from the group consisting of lithium acetate dihydrate ($CH_3COOLi \cdot 2H_2O$), lithium hydroxide monohydrate ($LiOH \cdot H_2O$), lithium hydroxide (LiOH), lithium carbonate ($Li_2CO_3$), lithium phosphate ($Li_3PO_4$), lithium phosphate dodecahydrate ($Li_3PO_4 \cdot 12H_2O$), and lithium oxalate ($Li_2C_2O_4$), or a mixture of at least two thereof.

In addition, the phosphor precursor may be any one selected from the group consisting of ammonium phosphate (($NH_4)_2HPO_4$), phosphoric acid, tri-ammonium phosphate trihydrate (($NH_4)_3PO_4 \cdot 3H_2O$), and ammonium dihydrogen phosphate ($NH_4H_2PO_4$), or a mixture of at least two thereof.

In addition, the at least two kinds of metal precursors may include an aluminum precursor, a titanium precursor, an yttrium precursor, or a zirconium precursor.

Particularly, the aluminum precursor may include aluminum acetate, aluminum nitrate, and aluminum oxide ($Al_2O_3$).

In addition, the titanium precursor may be any one selected from the group consisting of titanium(IV) butoxide (Ti($OCH_2CH_2CH_2CH_3)_4$) titanium(IV) isopropoxide (Ti[$OCH(CH_3)_2]_4$), titanium chloride ($TiCl_4$), titanium fluoride ($TiF_4$), and tetrakis dimethylamino titanium (TDMAT, Ti[N($CH_3)_2]_4$), or a mixture of at least two thereof.

In addition, the yttrium precursor may be any one selected from the group consisting of yttrium nitrate hexahydrate ($Y(NO_3)_3 \cdot 6H_2O$), yttrium acetate hydrate (($CH_3CO_2)_3Y \cdot H_2O$), yttrium chloride hexahydrate ($Cl_3Y \cdot 6H_2O$), and yttrium oxide ($Y_2O_3$), or a mixture of at least two thereof.

The zirconium precursor may be any one selected from the group consisting of zirconium(IV) oxynitrate hydrate ($ZrO(NO_3)_2 \cdot xH_2O$), zirconium propoxide ($C_{12}H_{28}O_4Zr$), zirconium oxychloride octahydrate ($Cl_2OZr \cdot 8H_2O$), or zirconium(IV) acetylacetonate ($Zr(C_5H_7O_2)_4$), or a mixture of at least two thereof.

In addition, in step (a) for synthesizing the lithium metal phosphate nanoparticles of the present invention, a molar ratio of the lithium precursor:the phosphor precursor:the at least two kinds of metal precursors may be 1.1 to 1.5:3:0.6 to 2.5, particularly, a molar ratio of the lithium precursor:the phosphor precursor:a first metal precursor:a second metal precursor may be 1.1 to 1.5:3:0.1 to 0.55:0.5 to 1.95, more particularly, 1.15 to 1.4:3:0.15 to 0.4:1.6 to 1.85, and more particularly, 1.4:3:0.4:1.6.

If the molar ratio of the phosphor precursor, the first metal precursor and the second metal precursor is within the range, a material having a NASICON structure and ionic conductivity of $1 \times 10^{-6}$ S/cm or more can be prepared, and if the molar ratio is greater than or less than the range, a nanoparticle material having the NASICON structure and the ionic conductivity may not be prepared.

In addition, in step (a) for synthesizing lithium metal phosphate nanoparticles of the present invention, a lithium metal phosphate compound may be prepared by stirring the mixture solution while elevating the temperature to 200° C.

In this case, the step of mixing and stirring may be conducted by stirring at 190° C. to 220° C., particularly, elevating to 200° C. for 3 to 24 hours.

Then, after finishing the reaction, the mixture solution is cooled to room temperature, and filtered to obtain lithium metal phosphate nanoparticles. The lithium phosphate nanoparticles thus obtained may be washed using acetone and methanol one by one.

Then, in step (b) in the method of the present invention, the lithium metal phosphate nanoparticles are dispersed in a dispersion solvent to prepare a coating solution.

In this case, the dispersion solvent may use an alcohol solvent such as ethanol and methanol.

After that, in step (c) in the method of the present invention, the coating solution and lithium transition metal oxide particles are mixed to dispose the lithium metal phosphate nanoparticles on the surface of the transition metal oxide particles.

Particularly, a wet method may be conducted by preparing a coating solution by dispersing a nanoparticulated lithium phosphate compound in a dispersion solvent, mixing and immersing the lithium transition metal oxide particles in the coating solution, and stirring at a temperature of 80° C.

Meanwhile, when a dry mixing reaction of the nanoparticulated lithium phosphate compound and the lithium transition metal oxide is conducted while applying mechanical energy without using a solvent as in the method of the present invention, the surface of the transition metal oxide particles may be damaged, and the disposition of the lithium metal phosphate nanoparticles on the surface thereof may be difficult.

In addition, in the method of the present invention, the step of heat treating may be additionally included or omitted according to the crystalline state of the lithium metal phosphate nanoparticles formed after the coating step. That is, when the lithium metal phosphate nanoparticles have a crystallized NASICON state, a subsequent step of heat treating is not necessarily conducted. However, when the lithium metal phosphate nanoparticles have an amorphous state, a subsequent step of heat treating is preferably conducted to transform its state into a crystalline state.

In this case, the step of heat treating may be conducted in an oxygen atmosphere or air atmosphere under an atmospheric pressure of 10 bars or less, while heating to a temperature range of 400 to 900° C. Heat treating time is not specifically limited, but for example, 0.5 to 5 hours is preferable.

By such a method of the present invention, about 0.1 wt % to 2 wt % of lithium metal phosphate nanoparticles may be disposed or coated on the surface of lithium transition metal oxide particles based on the total weight of the positive electrode active material.

Positive Electrode

In addition, a positive electrode including the positive electrode active material is provided in an embodiment of the present invention.

The positive electrode may be manufactured as follows.

A positive electrode active material composition is prepared by mixing the positive electrode active material of the present invention, a solvent, selectively at least one of a conductive agent, a binder and a filler, and the positive electrode active material composition is applied on a positive electrode current collector, dried, and rolled to manufacture a positive electrode plate on which a positive electrode active material layer is formed. Or, the positive electrode active material composition is cast on a separate support, and a film delaminated from the support is laminated on the aluminum current collector to manufacture a positive electrode plate on which the positive electrode active material layer is formed.

In this case, any conductive agents may be used without specific limitation as long as it has conductivity without causing the chemical change of a battery. Examples of the conductive agent may be graphite such as natural graphite and artificial graphite; carbonaceous materials such as carbon black, acetylene black, Ketjen black, channel black, furnace black, lamp black, thermal black; conductive fibers such as carbon fibers and metal fibers; metal powders such as a fluoride carbon, aluminum, and a nickel powder; conductive whiskers such as zinc oxide whiskers and potassium titanate whiskers; conductive metal oxides such as titanium oxide; or conductive polymers such as polyphenylene derivatives.

The conductive agent may be typically included in an amount of 1 to 30 wt % based on the total weight of a mixture including the positive electrode active material.

The binder may be any components assisting the bonding of an active material and a conductive agent, and bonding to a current collector, without specific limitation and may include, for example, polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber, a fluorine rubber, or various copolymers.

The binder may be commonly included in an amount of 1 to 30 wt % based on the total weight of a mixture including the positive electrode active material layer.

The filler is a component suppressing the expansion of an electrode and may be selectively used. Any fibrous materials which do not induce the chemical change of a battery may be used without specific limitation, and may include, for example, olefin-based polymers such as polyethylene, and polypropylene; and fibrous materials such as glass fibers, and carbon fibers.

The positive electrode current collector is not particularly limited as long as it has conductivity without causing the chemical change of a battery, and may use, for example, stainless steel, aluminum, nickel, titanium, baked carbon, aluminum or stainless steel that is surface-treated with one of carbon, nickel, titanium, silver, or the like.

Meanwhile, the current collector may typically have a thickness of 3 to 500 µm, and microscopic irregularities may be formed on the surface of the current collector to improve the adhesiveness of the positive electrode active material. The positive electrode current collector may be used in various shapes such as a film, a sheet, a foil, a net, a porous body, a foamed body, a non-woven fabric body, or the like.

Lithium Secondary Battery

Also, there is provided in an embodiment of the present invention, a lithium secondary battery comprising:

a positive electrode comprising a positive electrode active material of the present invention, a negative electrode comprising a negative electrode active material, a separator disposed between the positive electrode and the negative electrode, and a non-aqueous electrolyte.

The negative electrode is manufactured by, for example, coating a negative electrode mixture material including a negative electrode active material on a negative electrode current collector and drying, and in the negative electrode mixture material, components described above such as a conductive agent, a binder, and a filler may be included if needed.

The negative electrode current collector is not specifically limited as long as it has high conductivity without causing the chemical change of a battery, and, for example, copper, stainless steel, aluminum, nickel, titanium, baked carbon, copper or stainless steel that is surface-treated with carbon, nickel, titanium, silver, or the like, an aluminum-cadmium alloy, or the like may be used.

Meanwhile, the current collector may typically have a thickness of 3 to 500 µm, and microscopic irregularities may be formed on the surface of the current collector to reinforce the adhesion of a negative electrode active material as in the positive electrode current collector. The negative electrode current collector may be used in various shapes such as a film, a sheet, a foil, a net, a porous body, a foamed body, a non-woven fabric body, or the like.

The separator is disposed between the positive electrode and the negative electrode, and an insulating thin film having high ion permeability and mechanical strength may be used as the separator.

The pore diameter of the separator may be typically from 0.01 to 10 µm, and the thickness thereof may be typically from 5 to 300 µm.

The separator may use, for example, olefin-based polymers such as chemical resistant and hydrophobic polypropylene; and sheets or non-woven fabrics formed using glass fibers, polyethylene, or the like.

In the case where a solid electrolyte such as a polymer is used as the electrolyte, the solid electrolyte may be used as a separator too.

The lithium salt-containing non-aqueous electrolyte includes an electrolyte and a lithium salt, and the electrolyte includes a non-aqueous organic solvent or an organic solid electrolyte.

The non-aqueous organic solvent may use, for example, aprotic organic solvents such as N-methyl-2-pyrrolidone, propylene carbonate, ethylene carbonate, butylene carbonate, dimethyl carbonate, diethyl carbonate, gamma-butyrolactone, 1,2-dimethoxyethane, tetrahydroxyfuran, 2-methyl tetrahydrofuran, dimethyl sulfoxide, 1,3-dioxolane, formamide, dimethylformamide, dioxolane, acetonitrile, nitromethane, methyl formate, methyl acetate, phosphoric acid triesters, trimethoxy methane, dioxolane derivatives, sulfolane, methylsulfolane, 1,3-dimethyl-2-imidazolidinone, propylene carbonate derivatives, tetrahydrofuran derivatives, ethers, methyl propionate, and ethyl propionate.

The organic solid electrolyte may use, for example, polyethylene derivatives, polyethylene oxide derivatives, polypropylene oxide derivatives, polymers of phosphoric acid ester, poly agitation lysine, polyester sulfide, polyvinyl alcohol, polyvinylidene fluoride, a polymer containing ionic dissociation group.

The lithium salt is a material which is liable to dissolve in the non-aqueous electrolyte and may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, low aliphatic carbonic acid lithium, 4-phenyl boronic acid lithium, imide, etc.

In addition, materials such as pyridine, triethylphosphite, triethanolamine, cyclic ethers, ethylene diamine, n-glyme, hexa phosphoric acid tri amide, nitrobenzene derivatives, sulfur, a quinone imine dye, N-substituted oxazolidinones, N,N-substituted imidazolidines, ethylene glycol dialkyl ethers, ammonium salts, pyrrole, 2-methoxy ethanol, and trichloro aluminum may be added to the electrolyte to improve charge and discharge properties, flame retardancy, or the like. In some cases, a halogen-containing solvent such as carbon tetrachloride and trifluoro ethylene may be further included to provide flame retardancy, and a carbon dioxide gas may be further included to improve conservative properties at a high temperature.

Hereinafter, examples will be described in detail to particularly explain the present invention. The invention may, however, be embodied in many different forms and should not be construed as being limited to the examples set forth herein. Examples of the present invention are provided to more completely explain the present invention to a person with ordinary skill in the art.

EXAMPLES

I. Preparation of Lithium Metal Phosphate Nanoparticles

Preparation Example 1: Preparation of $Li_{1.4}Al_{0.4}Ti_{1.6}(PO_4)_3$ Nanoparticles To a reactor at an atmospheric pressure, 500 ml of 1,4-butanediol was added, and lithium hydroxide, phosphoric acid, aluminum acetate, and titanium(IV) butoxide were added and mixed one by one in a molar ratio of 1.4:3:0.4:1.6. The mixture solution thus obtained was heated to 200° C. and stirred for reaction for 10 hours. After finishing the reaction, remaining reaction product was cooled and separated using a centrifuge. The separated product was washed using methanol to prepare uncrystallized $Li_{1.4}Al_{0.4}Ti_{1.6}(PO_4)_3$ nanoparticles which have a particle size of several tens nm (see FIG. 1). Then, the $Li_{1.4}Al_{0.4}Ti_{1.6}(PO_4)_3$ nanoparticles thus obtained was additionally heat treated at a temperature of 750° C. or more to prepare crystalline $Li_{1.4}Al_{0.4}Ti_{1.6}(PO_4)_3$.

Figure 2:
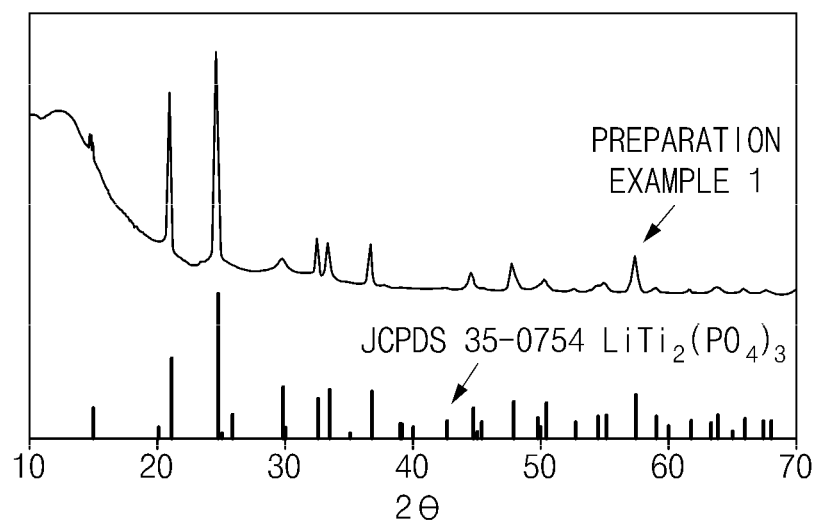
FIG. 2 is an XRD graph on lithium metal phosphate nanoparticles prepared in Preparation Example 1.

The production of the crystalline $Li_{1.4}Al_{0.4}Ti_{1.6}(PO_4)_3$ can be identified by comparing with an XRD graph on $LiTi_2(PO_4)_3$ crystal phase. For example, as shown in FIG. 2, the production of $Li_{1.4}Al_{0.4}Ti_{1.6}(PO_4)_3$ was identified by peaks shown at similar positions having similar intensity as those of the crystalline XRD graph of $LiTi_2(PO_4)_3$. Particularly, in the present invention, it can be found from the shift of some peaks that Al is partially substituted for.

Preparation Example 2: Preparation of $Li_{1.15}Y_{0.15}Zr_{1.85}(PO_4)_3$ Nanoparticles To a reactor at an atmospheric pressure, 500 ml of 1,4-butanediol was added, and lithium hydroxide, phosphoric acid, yttrium acetate hydrate, and zirconium(IV) acetylacetonate were added and mixed one by one in a molar ratio of 1.15:3:0.15:1.85. The mixture solution thus obtained was heated to 200° C. and stirred for reaction for 10 hours. After finishing the reaction, remaining reaction product was cooled and separated using a centrifuge. The separated product was washed using methanol to prepare uncrystallized $Li_{1.15}Y_{0.15}Zr_{1.85}(PO_4)_3$ nanoparticles which have a particle size of several tens nm.

Figure 3:
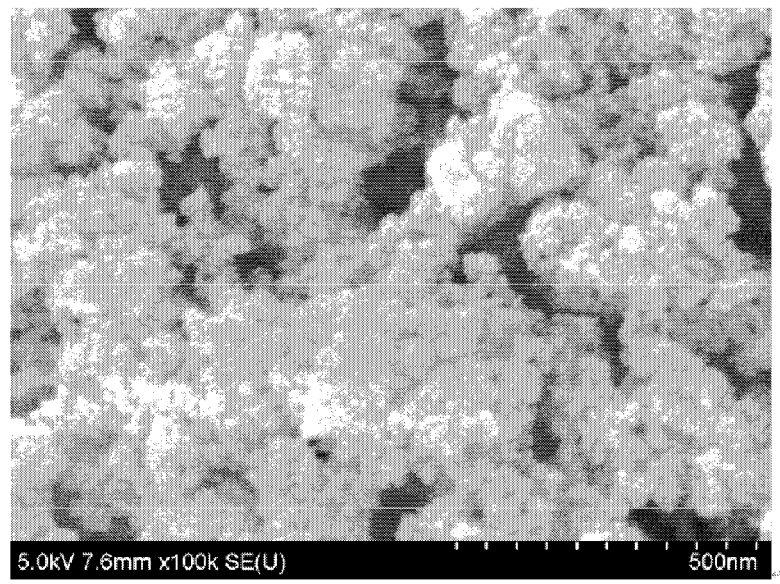
FIG. 3 illustrates a scanning electron microscope (SEM) image of lithium metal phosphate nanoparticles prepared in Preparation Example 2.

Then, the $Li_{1.15}Y_{0.15}Zr_{1.85}(PO_4)_3$ nanoparticles thus obtained was additionally heat treated at a temperature of 750° C. or more to prepare crystalline $Li_{1.4}Y_{0.4}Ti_{1.6}(PO_4)_3$ (see FIG. 3).

Figure 4:
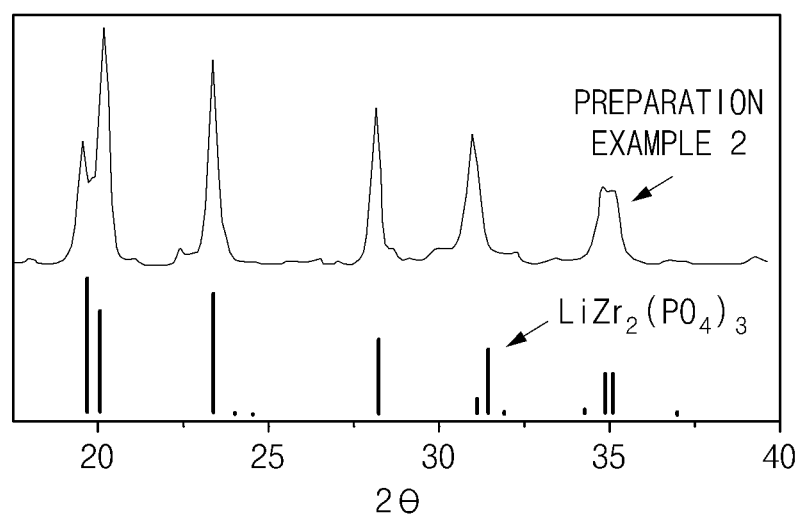
FIG. 4 is an XRD graph on lithium metal phosphate nanoparticles prepared in Preparation Example 2.

The production of the crystalline $Li_{1.4}Y_{0.4}Ti_{1.6}(PO_4)_3$ can be identified by comparing with an XRD graph on $LiZr_2(PO_4)_3$ crystal phase. For example, as shown in FIG. 4, the production of $Li_{1.4}Y_{0.4}Ti_{1.6}(PO_4)_3$ was identified by peaks shown at similar positions having similar intensity as those of the crystalline XRD graph of $LiZr_2(PO_4)_3$. Particularly, in the present invention, it can be found from the shift of some peaks that Y is partially substituted for.

II. Preparation of Positive Electrode Active Material and Manufacture of Secondary Battery Example 1

(Preparation of Positive Electrode Active Material)

The lithium metal phosphate (LATP) nanoparticles of Preparation Example 1 were dispersed in ethanol in an appropriate concentration to prepare a coating solution, and lithium transition metal oxide particles ($LiNi_{0.85}Co_{0.10}Al_{0.05}O_2$, NCA) (20 g) were added and mixed with the coating solution, followed by stirring at a temperature of 80° C. until solvents were evaporated to prepare a positive electrode active material in which the lithium metal phosphate nanoparticles were disposed on the surface of the transition metal oxide particles.

Then, heat treatment in an oxygen atmosphere at a temperature of 750° C. was conducted.

Figure 5:
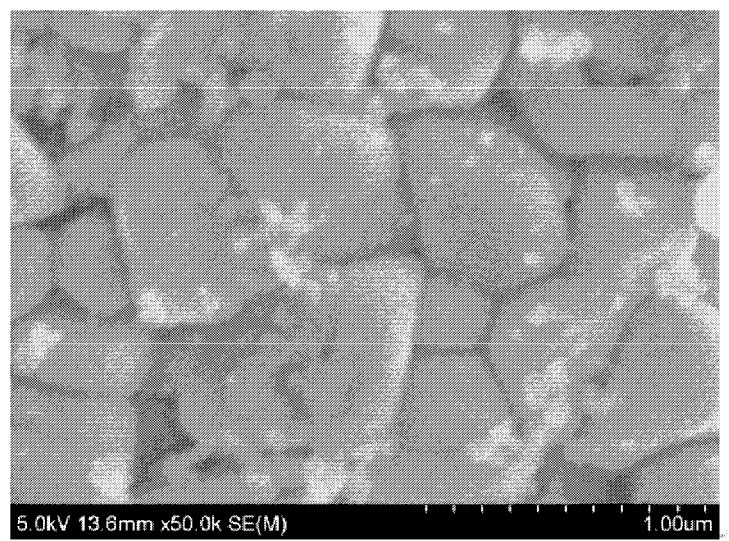
FIG. 5 illustrates a scanning electron microscope image of the surface of a positive electrode active material including lithium metal phosphate nanoparticles prepared in Example 1 of the present invention.

The positive electrode active material thus prepared was analyzed using an electron microscope, and it was found that the surface of the lithium transition metal oxide particles was coated with approximately 0.5 wt % the lithium metal phosphate nanoparticles based on the total weight of the positive electrode active material (see FIG. 5).

(Manufacture of Secondary Battery)

A positive electrode active material slurry was prepared by mixing the positive electrode active material, a conductive agent (SC65), and a binder (polyvinylidene fluoride) in a weight ratio of 93:4:3. The positive electrode slurry thus prepared was applied on an Al foil and rolled to manufacture a positive electrode plate for a coin cell. The positive electrode plate thus manufactured was punched to 1.6 cm and used, and a lithium metal was used as a counter electrode. The electrodes were put in a glove box in which an electrolyte (a mixture solution of ethylene carbonate and dimethyl carbonate (1:1 by volume ratio), in which 1 M $LiPF_6$ dissolved) was injected to manufacture a coin cell.

Example 2

(Preparation of Positive Electrode Active Material)

The lithium metal phosphate (LATP) nanoparticles of Preparation Example 1 were dispersed in ethanol in an appropriate concentration to prepare a coating solution, and lithium transition metal oxide particles ($LiNi_{0.6}Mn_{0.2}Co_{0.2}O_2$, NMC) (20 g) were mixed with the coating solution, followed by stirring at a temperature of 80° C. until solvents were evaporated to prepare a positive electrode active material in which phosphate nanoparticles were disposed on the surface of the lithium transition metal oxide particles.

Then, heat treatment in an oxygen atmosphere at a temperature of 450° C. was conducted.

Figure 6:
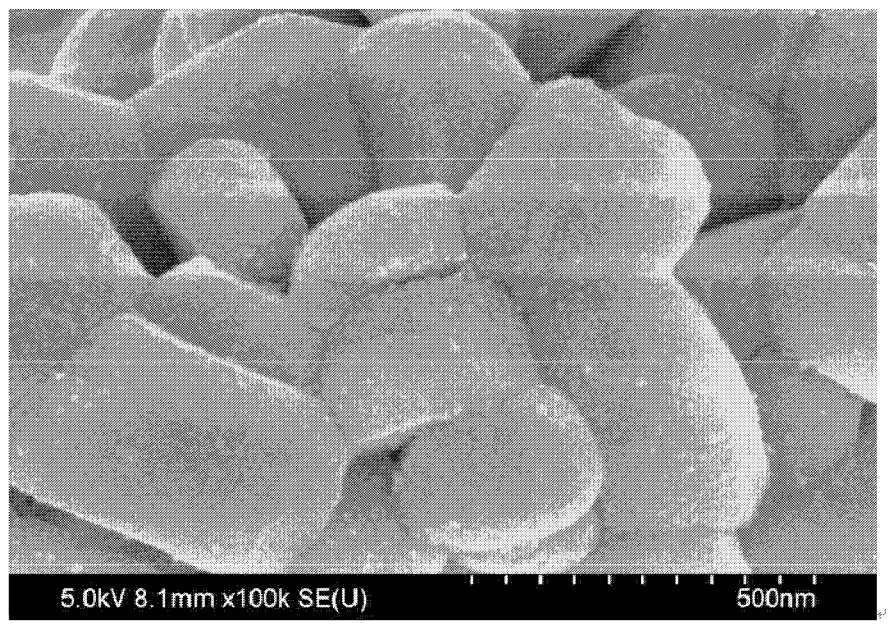
FIG. 6 illustrates a scanning electron microscope image of the surface of a positive electrode active material including lithium metal phosphate nanoparticles prepared in Example 2 of the present invention.

The positive electrode active material thus prepared was analyzed using an electron microscope, and it was found that the surface of the lithium transition metal oxide particles was coated with approximately 0.3 wt % the lithium metal phosphate nanoparticles based on the total weight of the positive electrode active material (see FIG. 6).

(Manufacture of Secondary Battery)

A coin cell was manufactured by conducting the same method described in Example 1 except for using the NMC positive electrode active material instead of the positive electrode active material (NCA) of Example 1.

Example 3

(Preparation of Positive Electrode Active Material)

The lithium metal phosphate nanoparticles of Preparation Example 1 were dispersed in ethanol in an appropriate concentration to prepare a coating solution, and a positive electrode active material ($LiCoO_2$) (20 g) was added and mixed with the coating solution, followed by stirring at a temperature of 80° C. until solvents were evaporated to prepare a positive electrode active material in which phosphate nanoparticles were disposed on the surface of the lithium transition metal oxide particles.

Then, heat treatment in an oxygen atmosphere at a temperature of 750° C. was conducted.

Figure 7:
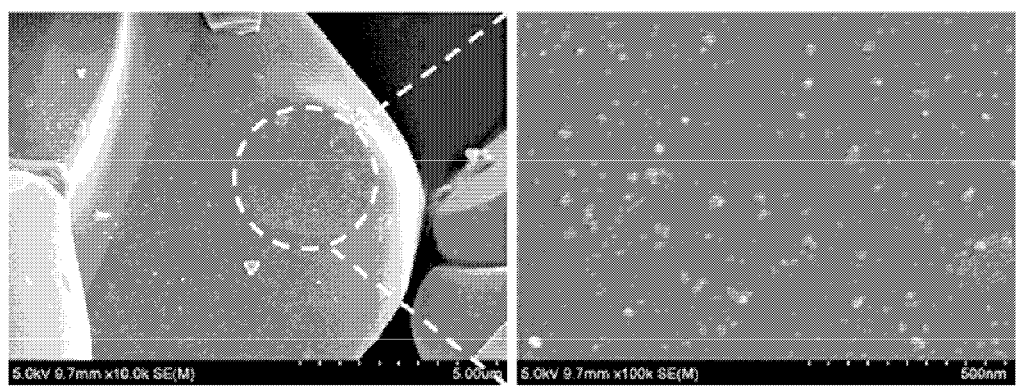
FIG. 7 illustrates scanning electron microscope images of the surface of a positive electrode active material including lithium metal phosphate nanoparticles prepared in Example 3 of the present invention.

The positive electrode active material thus prepared was analyzed using an electron microscope, and it was found that the surface of the lithium transition metal oxide particles was coated with approximately 0.5 wt % the lithium metal phosphate nanoparticles based on the total weight of the positive electrode active material (see FIG. 7).

(Manufacture of Secondary Battery)

A coin cell was manufactured by conducting the same method described in Example 1 except for using the $LiCoO_2$ positive electrode active material instead of the positive electrode active material (NCA) of Example 1, and using the positive electrode active material, the conductive agent (SC65), and the binder (polyvinylidene fluoride) in a weight ratio of 96:2:2.

Example 4

(Preparation of Positive Electrode Active Material)

The lithium metal phosphate nanoparticles (LYZP) having an average particle diameter of several tens nm according to Preparation Example 2 were dispersed in ethanol in an appropriate concentration to prepare a coating solution, and a positive electrode active material ($LiCoO_2$) (20 g) was added and mixed with the coating solution, followed by stirring at a temperature of 80° C. until solvents were evaporated to prepare a positive electrode active material in which phosphate nanoparticles were disposed on the surface of the lithium transition metal oxide particles.

Then, heat treatment in an oxygen atmosphere at a temperature of 750° C. was conducted.

Figure 8:
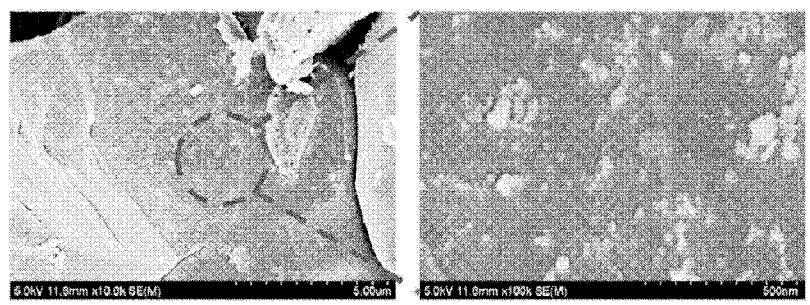
FIG. 8 illustrates scanning electron microscope images of the surface of a positive electrode active material including lithium metal phosphate nanoparticles prepared in Example 4 of the present invention.

The positive electrode active material thus prepared was analyzed using an electron microscope, and it was found that the surface of the lithium transition metal oxide particles was coated with approximately 0.5 wt % the lithium metal phosphate nanoparticles based on the total weight of the positive electrode active material (see FIG. 8).

(Manufacture of Secondary Battery)

A coin cell was manufactured by conducting the same method described in Example 1 except for using the positive electrode active material coated with the lithium metal phosphate nanoparticles of Preparation Example 2 instead of the lithium metal phosphate nanoparticles of Preparation Example 1, and using the positive electrode active material, the conductive agent (SC65) and the binder (polyvinylidene fluoride) in a weight ratio of 96:2:2.

Comparative Example 1

A coin cell was manufactured by conducting the same method described in Example 1 except for using a positive electrode active material ($LiNi_{0.85}Co_{0.10}Al_{0.05}O_2$, NCA) uncoated with lithium metal phosphate (LATP) nanoparticles.

Comparative Example 2

A coin cell was manufactured by conducting the same method described in Example 2 except for using a positive electrode active material ($LiNi_{0.6}Mn_{0.2}Co_{0.2}O_2$, NMC) uncoated with lithium metal phosphate (LATP) nanoparticles.

Comparative Example 3

A coin cell was manufactured by conducting the same method described in Example 3 except for using a positive electrode active material ($LiCoO_2$) uncoated with lithium metal phosphate (LATP) nanoparticles.

Comparative Example 4

$LiOH.H_2O$, and $(NH_4)_2HPO_4$ were added in a molar ratio of 3:1 to water to dissolve therein, and dried. A powder thus obtained was pulverized using a ball mill. The pulverized powder of amorphous $Li_3PO_4$ (3,000 ppm) was injected into ethanol to prepare a coating solution, and a positive electrode active material ($LiCoO_2$) (20 g) was mixed with the coating solution, followed by stirring at a temperature of 80° C. until solvents were evaporated and heat treating at a temperature of 450° C. to prepare a positive electrode active material including lithium metal phosphate nanoparticles.

Then, a coin cell was manufactured by conducting the same method as in Example 1 except for using the positive electrode active material.

EXPERIMENTAL EXAMPLES

Experimental Example 1

Electrochemical properties were evaluated for the coin cells manufactured in Example 1 and Comparative Example 1.

Particularly, the coin cells of Example 1 and Comparative Example 1 were charged and discharged 50 times at a voltage of 3.0 V to 4.6 V in a rate (c-rate) of 0.5 C, and capacity change and charge and discharge change in accordance with charge and discharge cycle were measured. The results are shown in FIGS. 9 and 10, respectively.

Figure 9:
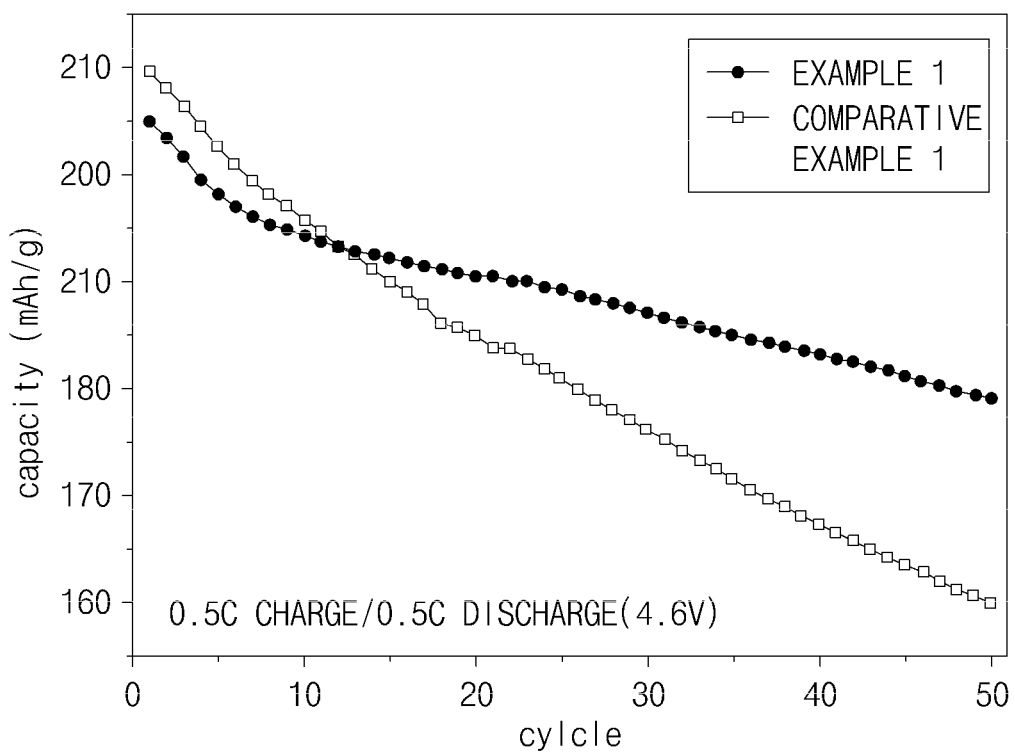
FIG. 9 is a graph showing capacity change in accordance with the charge and discharge cycle of a cell according to Experimental Example 1 of the present invention.

When examining the capacity change in accordance with charge and discharge cycle of FIG. 9, from the measured results of the capacity change in accordance with charge and discharge cycle for the coin cell manufactured using the positive electrode active material including the lithium metal phosphate nanoparticles according to Example 1 and the coin cell manufactured using the positive electrode active material not including the lithium metal phosphate nanoparticles according to Comparative Example 1, the capacity of the coin cell of Comparative Example 1 was consistently decreasing, but the capacity decrease width of the cell of Example 1 was smaller than that of Comparative Example 1.

Figure 10:
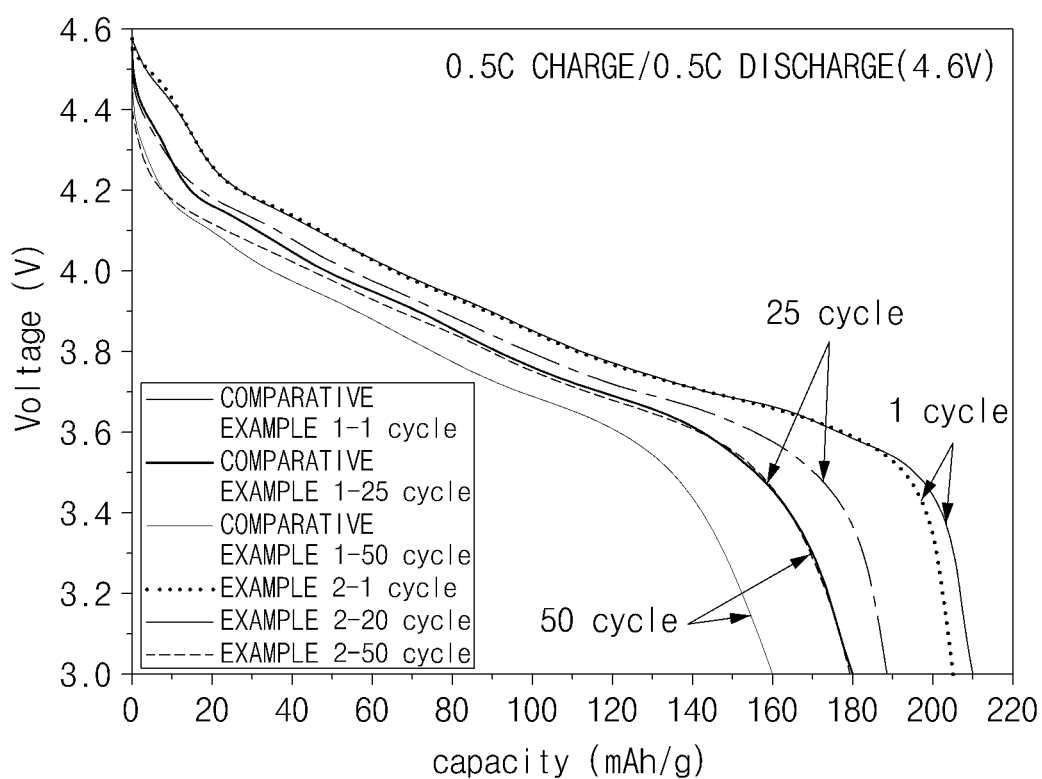
FIG. 10 is a graph showing charge and discharge change in accordance with the charge and discharge cycle of a cell according to Experimental Example 1 of the present invention.

In addition, when examining the charge and discharge change in accordance with charge and discharge cycle of FIG. 10, an initial capacity was slightly decreased at the first cycle for the coin cell of Example 1. However, as the cycle progresses, voltage drop and capacity decrease were small when compared to those of the coin cell of Comparative Example 1.

Experimental Example 2

Electrochemical properties were evaluated for the coin cells manufactured in Example 2 and Comparative Example 2.

Particularly, the coin cells of Example 2 and Comparative Example 2 were charged and discharged 50 times at a voltage of 3.0 V to 4.6 V in a rate (c-rate) of 0.5 C, and capacity change and charge and discharge change in accordance with charge and discharge cycle were measured. The results are shown in FIGS. 11 and 12, respectively.

Figure 11:
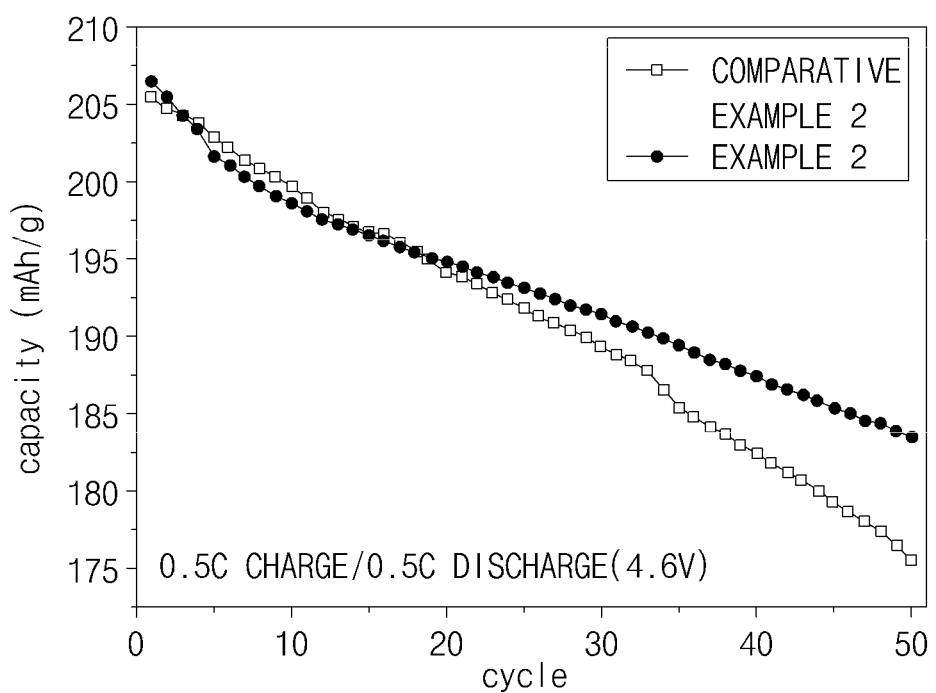
FIG. 11 is a graph showing capacity change in accordance with the charge and discharge cycle of a cell according to Experimental Example 2 of the present invention.

When examining the capacity change in accordance with charge and discharge cycle of FIG. 11, from the measured results of the capacity change in accordance with charge and discharge cycle for the coin cell manufactured using the positive electrode active material including the lithium metal phosphate (LATP) nanoparticles according to Example 2 and the coin cell manufactured using the positive electrode active material not including the lithium metal phosphate nanoparticles according to Comparative Example 2, the capacity of the cell of Example 2 and the cell of Comparative Example 2 showed similar capacity until 20 cycles, but the capacity decrease width of the cell of Comparative Example 2 was greater than that of Example 2 after that.

Figure 12:
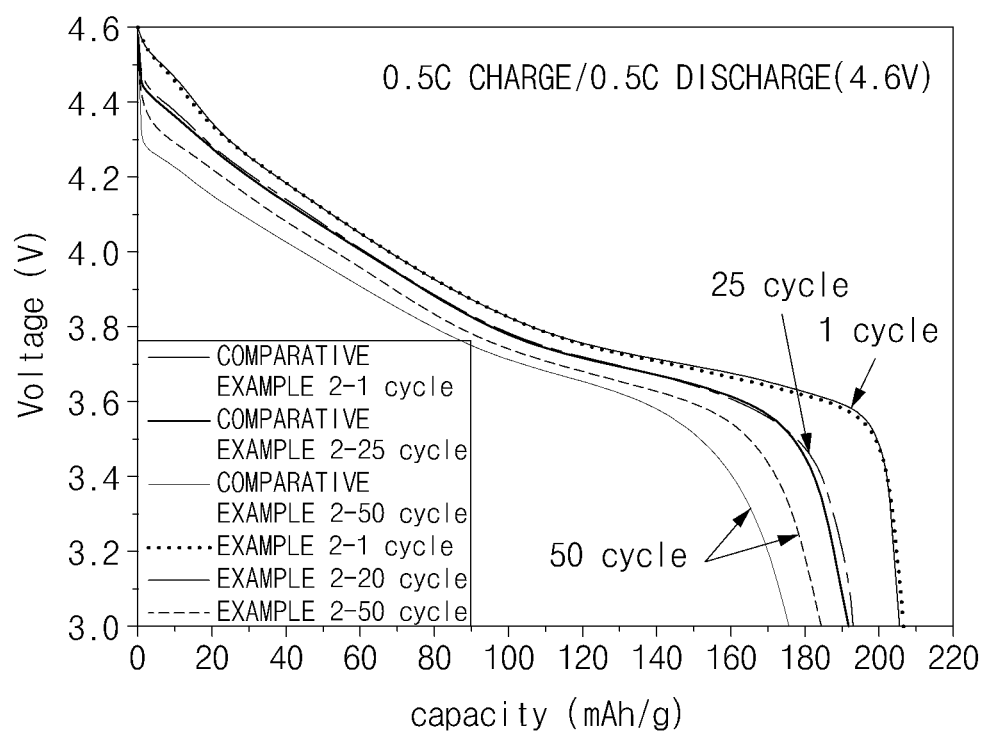
FIG. 12 is a graph showing charge and discharge change in accordance with the charge and discharge cycle of a cell according to Experimental Example 2 of the present invention.

In addition, when examining the charge and discharge change in accordance with charge and discharge cycle of FIG. 12, similar charge and discharge graphs were shown for the coin cells of Example 2 and Comparative Example 2 during progressing 4.6 V cycle at the first cycle. However, as the cycle progresses, voltage drop and capacity decrease were smaller and electrochemical properties were better for the cell of Example 2 when compared to those of the coin cell of Comparative Example 2.

Experimental Example 3

Electrochemical properties were evaluated for the coin cells manufactured in Examples 3 and 4 and Comparative Examples 3 and 4.

Particularly, the coin cells of Examples 3 and 4 and Comparative Examples 3 and 4 were charged and discharged at a voltage of 3.0 V to 4.6 V in a rate (c-rate) of 0.5 C during charge, and 1.0 C during discharge, and capacity change and charge and discharge change in accordance with charge and discharge cycle were measured. The results are shown in FIGS. 13 to 17, respectively.

Figure 13:
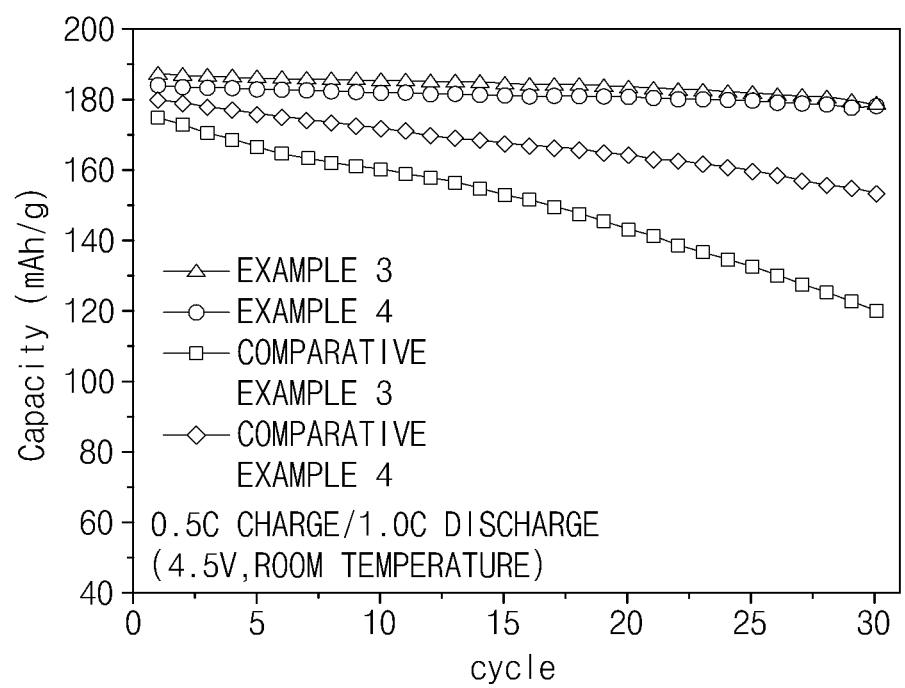
FIG. 13 is a graph showing capacity change in accordance with the charge and discharge cycle of a cell according to Experimental Example 3 of the present invention.
Figure 14:
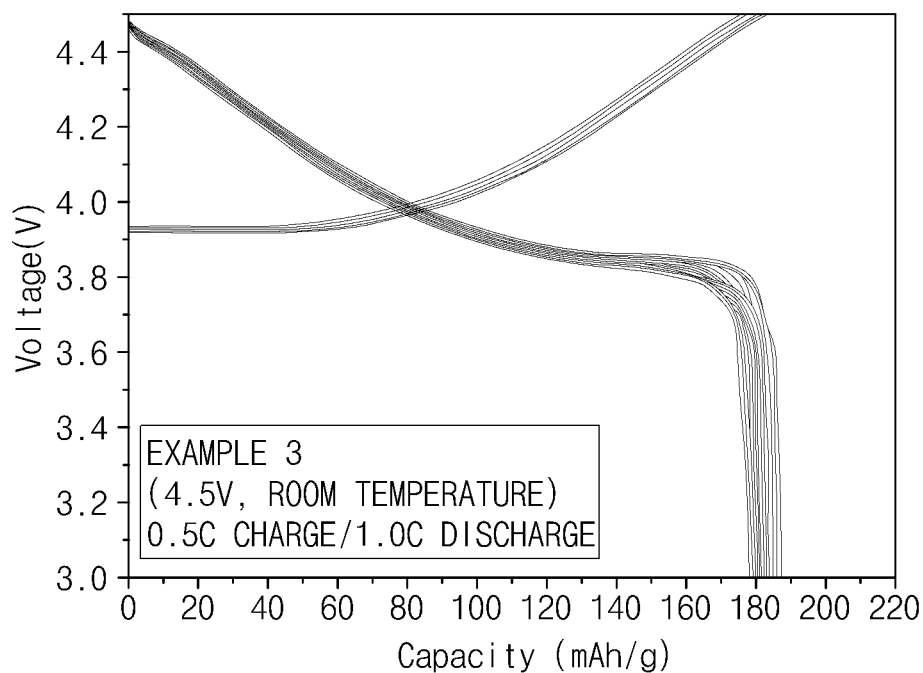
FIGS. 14 to 17 are graphs showing charge and discharge changes in accordance with the charge and discharge cycles of a cell according to Experimental Example 3 of the present invention.
Figure 15:
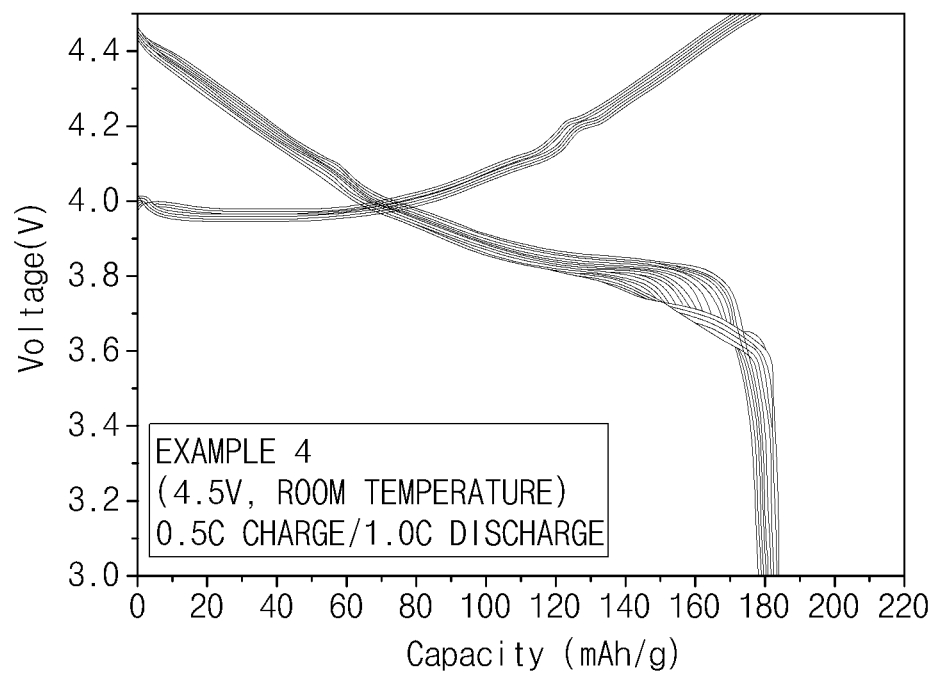
Figure 16:
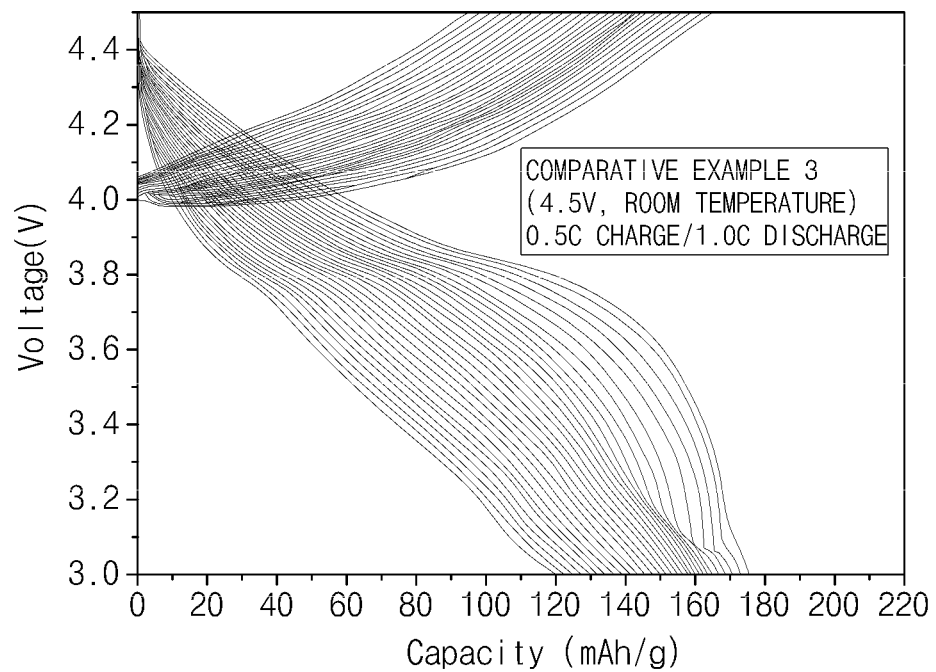
Figure 17:
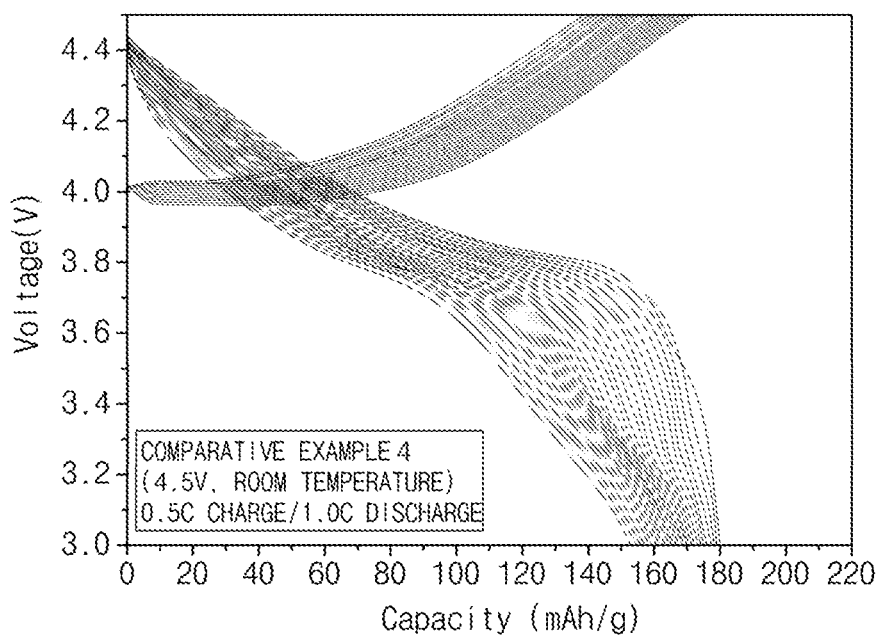

When examining the capacity change in accordance with charge and discharge cycle of FIG. 13, from the measured results of the capacity change in accordance with charge and discharge cycle for the coin cells of Examples 3 and 4 including the positive electrode active materials including the lithium metal phosphate nanoparticles, the coin cell of Comparative Example 3 not including the lithium metal phosphate nanoparticles, and the coin cell of Comparative Example 4 including a coating layer formed using amorphous lithium phosphate, the capacity of the coin cells of Comparative Examples 3 and 4 was consistently decreased according to the progress of cycle. On the contrary, even though the capacity of the coin cells of Examples 3 and 4 was decreased according to the progress of cycle, the capacity decrease width of the cells of Examples 3 and 4 was smaller than that of Comparative Examples 3 and 4. The results are considered to be obtained by preventing the direct contact of a positive electrode active material and an electrolyte by lithium metal phosphate nanoparticles disposed on the surface of lithium transition metal oxide particles, and thus preventing Co elution and deterioration of capacity decrease.

Particularly, when examining the charge and discharge change in accordance with the charge and discharge cycle of each cell in FIGS. 14 to 17, the coil cell of Comparative Example 3 including a positive electrode active material not including lithium metal phosphate nanoparticles (see FIG. 16) and the coin cell of Comparative Example 4 including a positive electrode active material including a lithium phosphate-containing coating layer instead of nanoparticles (see FIG. 17), Co was eluted at 4.5 V, and open circuit voltage (OCV) at the initiation of discharge was consistently decreased as cycle progressed.

On the contrary, in the coin cell of Example 3 (see FIG. 14) and the coin cell of Example 4 (see FIG. 15), manufactured using a positive electrode active material including lithium metal phosphate nanoparticles, it was confirmed that the side reactions with an electrolyte were prevented, structural stability was improved, and OCV at the initiation of discharge was maintained.

Meanwhile, capacity retention ratio was computed by dividing discharge capacity after 30 cycles of charge and discharge with discharge capacity at initial cycle as measured in FIG. 13, and the values are shown in Table 1 below.

TABLE 1

|  | Example 3 | Example 4 | Comparative Example 3 | Comparative Example 4 |
| --- | --- | --- | --- | --- |
| Capacity retention ratio after 30 cycles | 95.5% | 96.8% | 68.6% | 85.2% |

Referring to Table 1, the coin cells of Examples 3 and 4 showed capacity retention ratio after measuring 30 cycle life of 95.5% and 96.8%, respectively, and showed high capacity retention ratio. On the contrary, the coin cells of Comparative Examples 3 and 4 showed low capacity retention ratio of 68.6% and 85.2%, respectively.

Experimental Example 4

With respect to the coin cells of Examples 3 and 4 and the coin cells of Comparative Examples 3 and 4, charge and discharge was conducted once at a voltage of ①3.0 V to 4.5 V and initial rate of 0.2 C, and then was conducted with charge rate of 0.5 C with discharge rate of ②0.1 C, ③1.0 C, and ④2.0 C.

Measured results according to the initial charge and discharge and rate are shown in Table 2 below.

TABLE 2

|  | | Example 3 | Example 4 | Comparative Example 3 | Comparative Example 3 |
|---|---|---|---|---|---|
| Initial charge (0.2 C) | mAh/g | 196.2 | 195.4 | 195.7 | 195.1 |
| Initial discharge (0.2 C) | | 190.6 | 190.6 | 189.6 | 188.8 |
| Initial charge and discharge efficiency | % | 97.1 | 97.5 | 96.9 | 96.8 |
| 1.0 C (discharge)/0.2 (discharge) | | 96.1 | 98.6 | 94.9 | 96.2 |
| 2.0 C (discharge)/ 0.2 C (discharge) | | 92.0 | 94.9 | 88.6 | 89.7 |

Referring to Table 2, initial charge and discharge capacity and efficiency showed similar levels for Examples 3 and 4, and Comparative Examples 3 and 4.

However, the discharge capacity of 1.0 C and 2.0 C with respect to the initial discharge capacity for the coin cells of Examples 3 and 4 using the positive electrode active materials including lithium metal phosphate nanoparticles were higher than that of Comparative Examples 3 and 4.

Particularly, the capacity of the coin cells of Examples 3 and 4 with respect to 0.2 C at 2 C was 92.0% and 94.9%, respectively, but the capacity of the coin cells of Comparative Examples 3 and 4 was low and 88.6% and 89.7%.

From the results, it can be found that the positive electrode active material including the lithium metal phosphate nanoparticles of the present invention had improved lithium ion conductivity at the surface of the positive electrode active material during charge and discharge, increased rate, and decreased capacity decrease ratio.

Experimental Example 5

Figure 18:
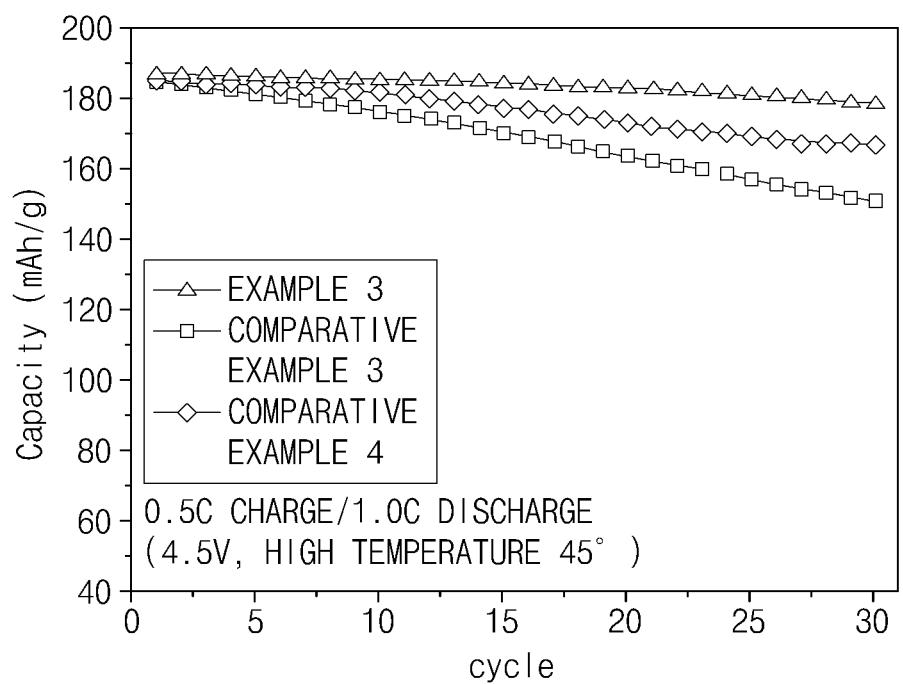
FIG. 18 is a graph showing capacity change in accordance with the charge and discharge cycle of a cell at a high temperature according to Experimental Example 5 of the present invention.

The coin cell of Example 3 and the coin cells manufactured in Comparative Examples 3 and 4 were charged and discharged 30 times with charged at 0.5 C and discharged at 1.0 C constant current in a voltage range of 3.0 to 4.5 V with respect to a lithium metal at a high temperature of 45° C., and the results are shown in FIG. 18.

When examining FIG. 18, it can be found that the capacity of the coin cells of Comparative Examples 3 and 4 was consistently decreased, but the capacity decrease of the coin cell of Example 3 was small with the progress of cycle.

Meanwhile, capacity retention ratio was computed by dividing discharge capacity after 30 cycles of charge and discharge measured in FIG. 18 with discharge capacity at initial cycle, and the values are shown in Table 3 below.

TABLE 3

|  | Example 3 | Comparative Example 3 | Comparative Example 4 |
|---|---|---|---|
| Capacity retention ratio after 30 cycles | 95.5% | 81.5% | 90.2% |

Referring to Table 3, it can be found that the capacity retention ratio after measuring 30 cycle life was 95.5% for Example 3, but the capacity retention ratios of the coin cell of Comparative Example 3 using the positive electrode active material not including lithium metal phosphate nanoparticles and the coin cell of Comparative Example 4 using the positive electrode active material including a coating layer containing lithium phosphate instead of nanoparticles were low and 81.5% and 90.2%, respectively.

According to the results, it can be found that a positive electrode active material in which lithium metal phosphate nanoparticles are formed, has excellent life characteristics at a high temperature as well as at room temperature.

The invention claimed is:

1. A positive electrode active material for a secondary battery, the positive electrode active material comprising:
   lithium transition metal oxide particles represented by the following Formula 1; and
   lithium metal phosphate nanoparticles disposed on a surface of the lithium transition metal oxide particles, the lithium metal phosphate nanoparticles being represented by the following Formula 2 and having an average particle diameter (D50) of 200 nm or less, the lithium metal phosphate nanoparticles present in an amount of 0.1 wt % to 2 wt % based on a total amount of the positive electrode active material:

   [Formula 1]

where M is at least one metal selected from the group consisting of Mn, Al, Cu, Fe, Mg, Cr, Sr, V, Sc and Y, 0≤a≤0.2, 0≤b≤1, and 0≤c≤1,

   [Formula 2]

where M' is Al, Y, Cr, or Ca, M" is Ge, Ti, Sn, Hf, Zn, or Zr, and 0≤x≤0.5.

2. The positive electrode active material for a secondary battery of claim 1, wherein the lithium metal phosphate nanoparticles represented by Formula 2 has a NASICON structure.

3. The positive electrode active material for a secondary battery of claim 1, wherein the lithium metal phosphate nanoparticles represented by Formula 2 comprise at least one selected from the group consisting of $LiTi_2(PO_4)_3$, $LiZr_2(PO_4)_3$, $Li_{1+x}Al_xTi_{2-x}(PO_4)_3$ (0≤x≤0.5), $Li_{1+x}Al_xZr_{2-x}(PO_4)_3$ (0≤x≤0.5), and $Li_{1+x}Y_xZr_{2-x}(PO_4)_3$ (0≤x≤0.5).

4. The positive electrode active material for a secondary battery of claim 1, wherein a lithium ion conductivity of the lithium metal phosphate nanoparticles at room temperature is from 1×10⁻³ S/cm to 1×10⁻⁵ S/cm.

5. The positive electrode active material for a secondary battery of claim 1, wherein an average particle diameter (D50) of the lithium metal phosphate nanoparticles is from 10 nm to 200 nm.

6. The positive electrode active material for a secondary battery of claim 1, wherein the lithium metal phosphate nanoparticles are comprised in an amount of 0.3 wt % to 1 wt % based on a total amount of the positive electrode active material.

7. A method for preparing the positive electrode active material for a secondary battery according to claim 1, the method comprising:
   (a) synthesizing the lithium metal phosphate nanoparticles represented by Formula 2;
   (b) dispersing the lithium metal phosphate nanoparticles in a dispersion solvent to prepare a coating solution; and
   (c) mixing the coating solution with lithium transition metal oxide particles to coat a surface of the lithium transition metal oxide particles with the lithium metal phosphate nanoparticles.

8. The method for preparing the positive electrode active material for a secondary battery of claim 7, further comprising a step of heat treating after coating.

9. The method for preparing the positive electrode active material for a secondary battery of claim 7, wherein step (a) for synthesizing the lithium metal phosphate nanoparticles comprises:

preparing a mixture solution by injecting a reaction solvent, a lithium precursor, a phosphor precursor, and at least two kinds of metal precursors into a reactor at an atmospheric pressure;

stirring the mixture solution while elevating a temperature to 200° C.; and cooling the mixture solution after finishing a reaction to obtain the lithium metal phosphate nanoparticles.

10. The method for preparing the positive electrode active material for a secondary battery of claim 9, wherein the reaction solvent comprises a diol, a polyol, or a glycol solvent which contains at least two hydroxyl groups in a molecule.

11. The method for preparing the positive electrode active material for a secondary battery of claim 10, wherein the reaction solvent comprises any one selected from the group consisting of ethylene glycol, 1,2-propylene glycol, 1,3-propylene glycol, glycerin, glycerol, diethyl glycol, 1,2-butanediol, 1,3-butanediol, 1,4-butanediol, and 2,3-butanediol, or a mixture of at least two thereof.

12. The method for preparing the positive electrode active material for a secondary battery of claim 9, wherein the lithium precursor comprises any one selected from the group consisting of lithium acetate dihydrate, lithium hydroxide monohydrate, lithium hydroxide, lithium carbonate, lithium phosphate, lithium phosphate dodecahydrate, and lithium oxalate ($Li_2C_2O_4$), or a mixture of at least two thereof.

13. The method for preparing the positive electrode active material for a secondary battery of claim 9, wherein the phosphor precursor comprises any one selected from the group consisting of ammonium phosphate, phosphoric acid, tri-ammonium phosphate trihydrate, and ammonium dihydrogen phosphate, or a mixture of at least two thereof.

14. The method for preparing the positive electrode active material for a secondary battery of claim 9, wherein the at least two metal precursors comprise a mixture of at least two selected from the group consisting of an aluminum precursor, a titanium precursor, an yttrium precursor, and a zirconium precursor.

15. The method for preparing the positive electrode active material for a secondary battery of claim 9, wherein a molar ratio of the lithium precursor: the phosphor precursor: the at least two metal precursors is 1.1 to 1.5:3:0.6 to 2.5.

16. The method for preparing the positive electrode active material for a secondary battery of claim 15, wherein a molar ratio of the lithium precursor: the phosphor precursor: a first metal precursor: a second metal precursor is 1.1 to 1.5:3:0.1 to 0.55:0.5 to 1.95.

17. A positive electrode for a secondary battery, the positive electrode comprising the positive electrode active material for a secondary battery of claim 1.

18. A lithium secondary battery comprising:
a positive electrode comprising a positive electrode active material;
a negative electrode comprising a negative electrode active material;
a separator disposed between the positive electrode and the negative electrode; and
a non-aqueous electrolyte,
wherein the positive electrode comprises the positive electrode for a secondary battery of claim 17.

* * * * *